United States Patent [19]

Freller et al.

[11] Patent Number: 4,508,432

[45] Date of Patent: Apr. 2, 1985

[54] ELECTROCHROMIC DISPLAY CELL II

[75] Inventors: Helmut Freller, Röthenbach; Konrad Mund, Uttenreuth, both of Fed. Rep. of Germany

[73] Assignee: Siemens Aktiengesellschaft, Berlin and Munich, Fed. Rep. of Germany

[21] Appl. No.: 420,928

[22] Filed: Sep. 21, 1982

[30] Foreign Application Priority Data

Sep. 29, 1981 [DE] Fed. Rep. of Germany ....... 3138760

[51] Int. Cl.³ .................................................. G02F 1/23
[52] U.S. Cl. ..................................................... 350/357
[58] Field of Search ......................................... 350/357

[56] References Cited

U.S. PATENT DOCUMENTS 4,343,767  8/1982  Long et al. ...................... 73/61.1 C

FOREIGN PATENT DOCUMENTS 3011506  1/1981  Fed. Rep. of Germany .

Primary Examiner—John K. Corbin
Assistant Examiner—Lynn Vandenburgh Kent
Attorney, Agent, or Firm—Kenyon & Kenyon

[57] ABSTRACT

An electrochromic display cell is described which has a front electrode of an electrochromic material, especially tungsten trioxide or iridium oxide, layered on a support surface and a rear electrode of vitreous carbon layered on a support surface. The rest potential and large capacity of the rear electrode permit a fast image cycle time at the front electrode and obviate the need to reverse potential polarity during cycling.

14 Claims, 1 Drawing Figure

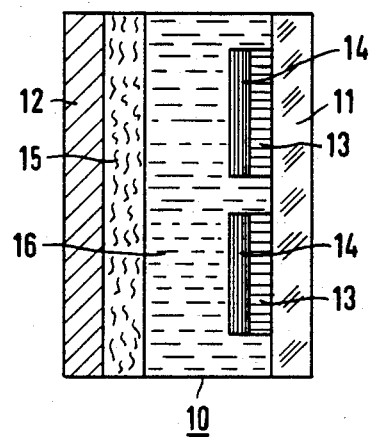

ELECTROCHROMIC DISPLAY CELL II

BACKGROUND OF THE INVENTION

The invention relates to an electrochromic display cell which has a front electrode, a rear electrode and an interspaced electrolyte. More specifically, the display cell employs a vitreous carbon rear electrode which allows a fast cycle time for the display image.

Electrochromic displays are used to indicate alphanumeric characters and are generally designed as flat cells. The front electrode of a typical cell is made of a transparent front supporting surface such as glass, a transparent, electrically conductive layer such as indium oxide ($In_2O_3$), and a layer of electrochromic material. The electrochromic layer of the front electrode contacts an electrolyte which supplies the ions required for the electrochromic reaction of the electrochromic layer. The rear electrode may have a similar structure and the working layer, which may also be an electrochromic material, likewise contacts the electrolyte. The back supporting surface of the rear electrode may, however, be made of a metal plate such as aluminum, titanium, nickel or alloy steel and an electrochromic layer may be applied thereto.

In a typical imaging configuration, the front electrode of the cell has a plurality of individual, separated segments of the conductive and electrochromic layers. Each segment has its own electrical connector and together the segments are spatially arranged so that application of an electrical potential to a selected number of them will produce a particular alphanumeric character. The conductive and electrochromic layers of the rear electrode are not typically segmented but are uninterrupted over the entire rear electrode area. Alternatively, the entire cell including the front and rear electrodes may be segmented so as to produce an imaging configuration or several unitary cells may be spatially arranged in a similar manner.

It is known that the electrochromic material for the front electrode of electrochromic cells can be made from a number of inorganic compounds, see, for example, U.S. Pat. No. 3,819,252 and U.S. Pat. No. 3,827,784. Typically, tungsten trioxide ($WO_3$) is used. The rear electrode generally is made of tungsten trioxide or graphite in the form of paper, fabric or felt. The electrolyte may be present as a liquid, a gel or paste or as a solid. While sulfuric acid can and has been used as the electrolyte, an aprotic, non-aqueous solvent such as propylene carbonate, containing an alkali metal salt such as lithium perchlorate, $LiClO_4$ is also used as the electrolyte. See, for example, German Offenlegungsschrift No. 30 11 506, page 1, lines 3 to 15, and page 2, lines 20 to 25.

Electrochromic cells with tungsten trioxide front and rear electrodes may be of symmetrical or asymmetrical design. In a symmetrical design, the thickness of the tungsten trioxide layers is the same, for example, about 0.5 microns. In these cells, the image shown by the front electrode is produced or erased by reversing the polarity of the voltage. In an asymmetrical design, the tungsten trioxide layer of the rear electrode is substantially thicker than that of the front electrode; see, for example, the description in German Offenlegungsschrift No. 29 06 320 or the corresponding European Pat. No. 0 015 402. In the asymmetrical design, the tungsten trioxide layer of the rear electrode is maintained at a potential which causes coloration so that those segments of the front electrode which are short-circuited to the rear electrode, likewise become colored. Such an arrangement requires a driving voltage only to erase the image.

Rear electrodes of the foregoing types, however, still have specific shortcomings. A tungsten trioxide electrode in a symmetrically constructed cell does not settle to a stable potential during cycling and therefore makes continuous operation more difficult. In addition, the low capacity of this electrode is a disadvantage. In an asymmetrical design, the rear electrode is slightly polarized, but it must first be colored by application and maintenance of a potential. Because of the manufacturing costs to perform the vapor deposition of such thick tungsten trioxide layers, the asymmetric cells are also expensive. Graphite layers, which can also be employed as rear electrodes, exhibit good electrochemical properties, but are difficult to connect to electrical contacts, do not permit a fast cycle time and are costly to integrate into electrochromic cells.

SUMMARY OF THE INVENTION

It is an object of the invention, therefore, to provide an electrochromic display cell having front and rear electrodes and an electrolyte between them wherein the rear electrode has a rest potential relative to the potential range of the front electrode. A further object is to provide a device with a large capacity, and wherein its charge can be reversed in a short time.

According to the invention, these objects are achieved by a display cell having a front electrode made of an electrochromic layer on an outer support surface, a rear electrode made of a vitreous carbon layer on an outer support surface, and an electrolyte contacting the front and rear electrode layers.

The electrolyte may be any ion conductive medium which is chemically inert toward the front and rear electrode layers. The electrolyte may be a gel, paste, semi-solid or liquid and may be neat or in a matrix with a nonconductive net of inert material. Preferred electrolytes include strong acids such as sulfuric acid as well as an inert organic solvent and an inorganic, conductive salt such as lithium perchlorate, lithium stearate, alkali and alkaline earth metal salts and the like. Lithium perchlorate in an organic solvent is especially preferred as is sulfuric acid.

A preferred embodiment of the invention is a display cell having a rear electrode composed entirely of vitreous carbon wherein the inner cross sectional portion of the vitreous carbon is activated and serves as working layer and wherein the remainder of the vitreous carbon is the support surface.

Another preferred embodiment is a display cell having a front electrode comprising a tungsten trioxide layer as electrochromic layer.

Another preferred embodiment is a display cell with an electrolyte of sulfuric acid or propylene carbonate and lithium perchlorate.

Yet another preferred embodiment is a display cell with a front electrode having a layer of indium oxide interspaced between a tungsten trioxide layer and the support surface.

BRIEF DESCRIPTION OF THE DRAWING

FIG. 1 depicts a side view of a display having a vitreous carbon rear electrode and a segmented front electrode.

DETAILED DESCRIPTION OF THE INVENTION

The electrochromic display cell according to the invention has a front electrode made of an outer support surface and an electrochromic layer, a rear electrode made of an outer support surface and a vitreous carbon layer and an electrolyte contacting the layers. The reversible rear electrode has a large capacity and rest potential which is similar to the electrochromic cycling potential of the front electrode. As a result of the large capacity, the potential of the rear electrode undergoes minimal change during the electrochromic cycling reaction of the front electrode. For example, with a charge transport of about 10 mC per sq cm, there is only a minor change and this potential change is small as compared to that of the front electrode. In contrast to graphite electrodes, where the usefulness of the capacity is inhibited by the high diaphragm resistance of the porous graphite layer, the capacity of the porous vitreous carbon rear electrode is readily available. This means that charge transport occurs quickly and the cycle time for the coloration reaction is therefore short.

The rest potential of the rear electrode of the invention corresponds to that of a decolorized or transparent tungsten trioxide electrode. By shorting the rear electrode with appropriate segments of the front electrode, this rest potential will produce a colorless state in these segments so that the image observed on the front electrode can be changed or cycled. The supply voltage polarity of the display therefore need not be reversed which reduces the energy requirement of the display. Furthermore, losses at the rear electrode are avoided, and the speed of image formation is substantially determined by the front electrode. In addition to these properties, the rear electrode has high electric conductivity and a large specific surface area, as well as being electrochemically inert.

The rear electrodes of vitreous carbon used in the electrochromic display are preferably activated. Such rear electrodes are produced by oxidatively treating the surface of planar shaped vitreous carbon which is to become the electrode surface. This treatment activates the corresponding cross sectional portion of the carbon and leads to a micro-porous structure extending from the electrode surface through this cross sectional portion. In order to activate oxidatively the vitreous carbon serving as a rear electrode, air at a temperature between about 450° and 600° C., or carbon dioxide at a temperature between about 800° and 1200° C. may be used. Also, steam at a temperature between about 800° and 900° C. can be used. The oxidation is conducted preferably in a controlled gas flow chamber and the activating time will be up to 2 hours, preferably between 10 and 60 minutes.

In a typical embodiment of the electrochromic display cell according to the invention, the vitreous carbon rear electrode can be formed in the shape of a tub or cup and sealed by the edges of the outer support surface of the front electrode. In this example, oxidative activation is accomplished on the inside surface of the cup. Then, the cup is filled with the electrolyte and peripheral edge of the support surface of the front electrode, which is not layered with electrochromic material, joined to the rim of the cup.

Vitreous or glassy carbon is a well known form of nongraphitizable carbon which is generally produced by heating in an inert atmosphere high molecular weight cross linked organic polymers. It resembles black glass in appearance and the cross-linking is believed to inhibit the formation of graphite-like crystallites. The density of vitreous carbon is generally low and it is extremely chemically inert. In a typical preparative method, a cross linked synthetic resin, especially prepared of phenol-formaldehyde or furan is pyrolized while slowly raising the temperature to a minimum of 750° C. If the shrinkage which occurs during such pyrolysis is taken into consideration, the vitreous carbon can be produced in any form; for example, the polymer may be cast the shape of a cup and then pyrolyzed to form a vitreous carbon cup.

The thickness of the vitreous carbon rear electrode is generally between about 10 and 20 microns when it is layered on a supporting surface. In addition, the rear electrode may be composed entirely of vitreous carbon by casting a self supporting vitreous carbon shape of greater thickness and activating one side as the surface for contact with the electrolyte. The activated layer formed thereby (thickness: 10 to 20 microns) then represents the active part of the rear electrode, while the remaining part of the vitreous carbon shape can serve as the rear support of the display cell.

In the display cell according to the invention, a front electrode having tungsten trioxide layer is preferably employed but this layer may also be made of iridium oxide. Sulfuric acid or lithium perchlorate in propylene carbonate is in particular used as the electrolyte.

The invention shall be further explained through the description of embodiments shown by the drawing and by a description of electrochemical tests performed upon an examplary display according to the invention.

In the embodiment shown by the Figure, the display 10 has a front plate (support surface) 11 of glass and a rear plate (support surface) 12 of a glass or metal. To the front plate 11 is applied, on the side facing the rear plate 12, a tungsten trioxide layer in the form of individual segments 14. To make these segments, the glass is masked with an inert stencil formed in the outline of the individual segments and a contact layer 13 of indium oxide is first applied to the front plate 11 and thereupon an electrochromic layer 14 of tungsten trioxide is applied. The mask is removed to provide the individual segments. Alternatively, the segments may be electrically or mechanically produced from a continuous front electrode by machining or etching or a similar technique. The rear plate 12 is provided, on the side facing the front electrode, with a layer 15 of vitreous carbon. The space between the front and the rear electrode is filled with an electrolyte 16 such as propylene carbonate/$LiClO_4$. A fabric, for instance, of zirconium oxide, may also be provided for receiving the electrolyte.

Electrical conductivity, capacitance, half cell potential and current transport tests of the rear electrode were conducted using a vitreous carbon rear electrode display cell designed according to the invention. An electrochemical half-cell arrangement, which compared the rear electrode of the cell to an external standard potential, was used to perform the measurements. The rest potential was measured against a lithium reference electrode. The impedance was determined at a small voltage amplitude ($V_{rms} = 10$ mV) by means of a frequency response analyzer and a potentiostat as a function of the frequency. The disc-shaped vitreous carbon rear electrodes used were prepared by oxidative activation in air at a temperature of about 500° C. for about 40 minutes.

According to these test measurements on the display cell containing the aprotic electrolyte propylene carbonate with 1M LiClO$_4$ (temperature: 22° C.), the vitreous carbon rear electrode stabilized to a half cell potential relative to lithium of 3.2 V, i.e., the rest potential was 3.2 V, as measured against an external standard lithium reference electrode. This potential corresponded to the potential of the uncolored, bleached tungsten trioxide electrode. The double layer capacity of the electrode was shown to be very large. Using impedance measurements it was determined to be about 50 to 100 mF cm$^{-2}$ at a frequency of 1 Hz.

As expected based upon the foregoing measurement results, fast cycle electrochromic displays were built according to the invention using vitreous carbon rear electrodes and tungsten trioxide front electrodes. The segments of the front electrode were bleached if they were short-circuited with the rear electrode, and they were colored within at most a second, if a voltage differential of 0.8 V was applied between the front and rear electrodes. In the cyclic potential jump at the tungsten trioxide front electrode, the potential of the vitreous carbon rear electrode was changed by about 0.3 V.

What is claimed is:

1. An electrochromic display cell comprising a front electrode having an electrochromic layer and an outer support surface, a rear electrode having an activated vitreous carbon layer and an outer support surface, and an electrolyte contacting the electrochromic and activated vitreous carbon layers.

2. A cell according to claim 1 wherein the outer support surface of the front electrode is glass and the outer support surface of the rear electrode is metal or glass.

3. A cell according to claim 1 wherein the activated vitreous carbon layer is from about 10 to about 20 microns thick.

4. A cell according to claim 1 wherein the rear electrode is entirely vitreous carbon with an activated surface contacting the electrolyte.

5. A cell according to claim 1 wherein the rear electrode has the shape of a cup and the peripheral edge of the outer support surface of the front electrode is joined to the rim of the cup.

6. A cell according to claim 1 wherein the electrochromic layer comprises electrically distinct, individual segments, each having its own electrical contact.

7. A cell according to claim 1 wherein the electrochromic layer consists of tungsten trioxide.

8. A cell according to claim 7 which further comprises a contact layer of indium oxide interspaced between the tungsten trioxide layer and the outer support surface.

9. A cell according to claim 1 wherein the electrolyte is an inert organic compound containing an ionic inorganic salt.

10. A cell according to claim 9 wherein the salt is an alkali or alkaline earth metal salt.

11. A cell according to claim 10 wherein the salt is lithium perchlorate.

12. A cell according to claim 9 wherein the compound is propylene carbonate.

13. A cell according to claim 1 wherein the electrolyte is sulfuric acid.

14. A cell according to claim 6 wherein the segments are spatially arranged as a multiply indicating alphanumeric character.

* * * * *